United States Patent [19]
Rinderer

[11] Patent Number: 5,961,081
[45] Date of Patent: Oct. 5, 1999

[54] CABLE SUPPORT HAVING PIVOTALLY AND SLIDABLE RETAINER

[75] Inventor: Eric R. Rinderer, Highland, Ill.

[73] Assignee: Sigma-Aldrich Co., Highland, Ill.

[21] Appl. No.: 08/834,488

[22] Filed: Apr. 14, 1997

[51] Int. Cl.$^6$ ..................................................... F16L 3/22
[52] U.S. Cl. ........................................ 248/68.1; 248/305
[58] Field of Search ............................. 248/62, 72, 74.1, 248/74.2, 71, 304, 305, 306, 301, 68.1; 174/40 CC, 166 R

[56] References Cited

U.S. PATENT DOCUMENTS

| | | |
|---|---|---|
| 116,905 | 8/1871 | Stohler et al. . |
| D. 150,373 | 7/1948 | Schmidt ...................................... D21/1 |
| D. 150,380 | 7/1948 | Stephenson et al. ....................... D21/1 |
| 166,905 | 8/1875 | Stohler et al. . |
| D. 217,117 | 4/1970 | Gordon ........................... 174/40 CCU |
| D. 228,737 | 10/1973 | Mathews ................................... D8/230 |
| D. 258,489 | 3/1981 | Gipson ..................................... D8/333 |
| D. 258,715 | 3/1981 | Gipson ..................................... D8/333 |
| D. 260,363 | 8/1981 | Gipson ..................................... D8/333 |
| D. 261,960 | 11/1981 | Mathews ................................... D6/114 |

(List continued on next page.)

FOREIGN PATENT DOCUMENTS

| | | |
|---|---|---|
| 499910 | 12/1950 | Belgium . |
| 0 020 943 A1 | 1/1981 | European Pat. Off. . |
| 0 702 180 A1 | 3/1996 | European Pat. Off. . |
| 795708 A2 | 8/1996 | European Pat. Off. . |
| 381413 | 11/1906 | France . |
| 737503 | 12/1932 | France . |
| 1124627 | 5/1955 | France . |
| 77295 | 3/1959 | France . |
| 1248702 | 1/1960 | France . |
| 1474956 | 3/1967 | France . |
| 1563157 | 4/1969 | France . |
| 2711206 A1 | 10/1993 | France . |

(List continued on next page.)

OTHER PUBLICATIONS

"Class 44, Fastenings, Lock &c", date unknown, p. 160 (admitted prior art).
"Abridgment Class Furniture &c", date unknown, p. 218 (admitted prior art).
"There's Only One King In This Jungle," ERICO®, Inc., p. 1, admitted prior art.
"CADDY . . . CableCat Clip," ERICO®, Inc., p. 1, admitted prior art.
"The Data Connection," Frost Electric Supply Company, undated, pp. 1–5, admitted prior art.
"CADDY Installation Instructions," ERICO®, Inc., 1995, pp. 1–4.
"Vantrunk Cable Ladder System Main Standard Components",brochure, by BICC Vantrunk, Ltd., dated Jan. 1981,4 pages including pp. 18–19.
"The Sadle Rack", brochure, by Underground Devices, Inc., dated Sep. 1984, 2 pages and 4 photos showing "Saddle Rack" Device.

(List continued on next page.)

*Primary Examiner*—Ramon O. Ramirez
*Attorney, Agent, or Firm*—Senniger, Powers, Leavitt & Roedel

[57] ABSTRACT

A support clip for supporting cable in a generally horizontal position. The support clip comprises a generally J-shaped hook having a central cable supporting portion and first and second legs extending up from opposite ends of the central cable supporting portion. The clip further comprises a retaining member movable from a cable receiving position in which the retaining member is attached to the first leg and held in a position in which the retaining member does not interfere with insertion or removal of the cable in or from the support clip, to a cable retaining position in which the retaining member extends from the first leg to the second leg generally parallel to the central cable supporting portion to retain the cable within the hook of the support clip, and back to its cable receiving position.

15 Claims, 3 Drawing Sheets

U.S. PATENT DOCUMENTS

| | | | |
|---|---|---|---|
| 429,421 | 6/1890 | Coit . | |
| 521,149 | 2/1894 | Boyd . | |
| 525,891 | 6/1894 | Fricke . | |
| 576,339 | 2/1897 | Clayton . | |
| 617,524 | 1/1899 | Drake . | |
| 661,604 | 11/1900 | Grabler . | |
| 799,092 | 9/1905 | Rosenfeld . | |
| 831,245 | 9/1906 | Share . | |
| 939,368 | 1/1909 | Withem . | |
| 944,731 | 12/1909 | Gold . | |
| 1,007,138 | 10/1911 | Peirce . | |
| 1,056,596 | 3/1913 | Sidoli . | |
| 1,097,273 | 5/1914 | Tyler . | |
| 1,224,309 | 5/1917 | Lüpke, Jr. . | |
| 1,229,427 | 6/1917 | Erismann . | |
| 1,262,763 | 4/1918 | Farley . | |
| 1,320,828 | 11/1919 | Bilbrough . | |
| 1,356,040 | 6/1920 | Caskey . | |
| 1,399,456 | 12/1921 | Barry . | |
| 1,522,979 | 1/1925 | Ratigan . | |
| 1,571,144 | 1/1926 | Saignol . | |
| 1,588,172 | 6/1926 | Crocker . | |
| 1,600,224 | 9/1926 | Grundy . | |
| 1,652,695 | 12/1927 | Barber . | |
| 1,657,939 | 1/1928 | Rockwell . | |
| 1,670,902 | 5/1928 | Popps . | |
| 1,775,391 | 9/1930 | Fassinger . | |
| 1,783,976 | 12/1930 | Pleister . | |
| 1,784,244 | 12/1930 | Morris . | |
| 1,787,533 | 1/1931 | Kerschner . | |
| 1,802,964 | 4/1931 | Brady . | |
| 1,804,472 | 5/1931 | Leslie . | |
| 1,853,018 | 4/1932 | Knape . | |
| 1,861,100 | 5/1932 | Stanitz . | |
| 1,917,322 | 7/1933 | Peirce . | |
| 1,943,261 | 1/1934 | Knutson . | |
| 2,061,463 | 11/1936 | Hall . | |
| 2,198,839 | 4/1940 | Pittman et al. | 248/65 |
| 2,229,129 | 1/1941 | Riegelman . | |
| 2,241,657 | 5/1941 | Dehring . | |
| 2,285,632 | 6/1942 | Urbain | 211/60 |
| 2,319,832 | 5/1943 | Trochim . | |
| 2,339,992 | 1/1944 | Hohmeister . | |
| 2,362,317 | 11/1944 | Smith . | |
| 2,445,481 | 7/1948 | Wertz | 248/74 |
| 2,470,991 | 5/1949 | Kindorf et al. | 248/72 |
| 2,546,556 | 3/1951 | Miller | 248/72 |
| 2,570,957 | 10/1951 | Lee | 248/71 |
| 2,588,251 | 3/1952 | Kost | 248/74.2 X |
| 2,616,645 | 1/1952 | Kindorf et al. | 248/62 |
| 2,665,950 | 1/1954 | Johnson | 304/2 |
| 2,671,625 | 3/1954 | Buckley | 248/58 |
| 2,744,706 | 5/1956 | Gerdy | 248/60 |
| 2,854,824 | 10/1958 | Curry et al. | 61/45 |
| 2,862,368 | 12/1958 | Dempsey | 61/45 |
| 2,891,752 | 6/1959 | Genter | 248/71 |
| 2,928,637 | 3/1960 | Jansson | 248/68 |
| 2,999,661 | 9/1961 | Shuter | 248/62 |
| 3,016,220 | 1/1962 | Rose | 248/74 |
| 3,019,954 | 2/1962 | Faltin | 244/42.46 |
| 3,022,971 | 2/1962 | Cote | 248/58 |
| 3,032,600 | 5/1962 | Mayer | 136/6 |
| 3,117,758 | 1/1964 | Bauer | 248/71 |
| 3,130,948 | 4/1964 | Bedford, Jr. | 248/58 |
| 3,136,515 | 6/1964 | Potruch | 248/62 |
| 3,164,255 | 1/1965 | Jay | 211/60 |
| 3,173,639 | 3/1965 | Dunn | 248/65 |
| 3,181,827 | 5/1965 | Sassin | 248/74 |
| 3,194,524 | 7/1965 | Trumbull | 248/74.2 |
| 3,218,012 | 11/1965 | Volpe | 248/74.1 X |
| 3,232,572 | 2/1966 | Ekström | 248/216 |
| 3,273,837 | 9/1966 | Willert et al. | 248/59 |
| 3,279,300 | 10/1966 | Larson | 85/28 |
| 3,323,766 | 6/1967 | Schauster | 248/62 |
| 3,355,132 | 11/1967 | Jenkins | 248/59 |
| 3,430,905 | 3/1969 | Pepe | 248/74 |
| 3,506,227 | 4/1970 | Jenkins | 248/59 |
| 3,559,910 | 2/1971 | Babb | 248/59 |
| 3,771,665 | 11/1973 | Potter | 211/107 |
| 3,794,183 | 2/1974 | Colbridge | 211/176 |
| 3,861,015 | 1/1975 | Hooven | 29/203 MW |
| 3,888,439 | 6/1975 | Tuttle | 248/54 R |
| 3,938,447 | 2/1976 | Veale | 105/156 |
| 4,019,705 | 4/1977 | Habuda et al. | 248/58 |
| 4,032,096 | 6/1977 | Perrault et al. | 248/73 |
| 4,039,131 | 8/1977 | Perrault et al. | 248/73 |
| 4,042,198 | 8/1977 | Takeuchi | 248/62 |
| 4,189,124 | 2/1980 | Faris | 248/318 |
| 4,252,289 | 2/1981 | Herb | 248/62 |
| 4,254,930 | 3/1981 | Warren | 248/542 |
| 4,260,123 | 4/1981 | Ismert | 248/74 |
| 4,267,994 | 5/1981 | Lynch et al. | 248/65 |
| 4,347,999 | 9/1982 | Sato et al. | 248/73 |
| 4,407,478 | 10/1983 | Hodges | 248/62 X |
| 4,588,152 | 5/1986 | Ruehl et al. | 248/71 |
| 4,606,521 | 8/1986 | Williams | 248/214 |
| 4,697,770 | 10/1987 | Kirschner | 248/62 |
| 4,709,888 | 12/1987 | Cubit et al. | 248/73 |
| 4,826,111 | 5/1989 | Ismert | 248/49 |
| 4,840,334 | 6/1989 | Kikuchi | 248/73 |
| 4,842,237 | 6/1989 | Wollar | 248/548 |
| 4,903,920 | 2/1990 | Merritt | 248/71 |
| 4,936,530 | 6/1990 | Wollar | 248/71 |
| 4,961,554 | 10/1990 | Smowton | 248/68.1 |
| 4,971,272 | 11/1990 | Gudridge et al. | 248/74.5 |
| 4,978,090 | 12/1990 | Wichert et al. | 248/74.1 |
| 5,054,741 | 10/1991 | Ismert | 248/74.5 |
| 5,062,605 | 11/1991 | Muhlethaler | 248/68.1 |
| 5,193,769 | 3/1993 | Hofle | 248/59 |
| 5,335,349 | 8/1994 | Kutsch et al. | 455/6.1 |
| 5,385,320 | 1/1995 | Ismert et al. | 248/62 |
| 5,388,791 | 2/1995 | McCrory et al. | 248/68.1 |
| 5,507,460 | 4/1996 | Schneider | 248/225.21 |
| 5,542,631 | 8/1996 | Bruno | 248/58 |
| 5,639,049 | 6/1997 | Jennings et al. | 248/74.2 |
| 5,740,994 | 4/1998 | Laughlin | 248/68.1 |

FOREIGN PATENT DOCUMENTS

| | | |
|---|---|---|
| 901555 | 12/1941 | Germany . |
| 1960111 | 11/1969 | Germany . |
| 2353055 | 10/1973 | Germany . |
| 40 21 731 C1 | 7/1990 | Germany . |
| 195 40 676 A1 | 1/1995 | Germany . |
| 295 17 271 U1 | 1/1995 | Germany . |
| 196 19 550 A1 | 5/1996 | Germany . |
| 296 19 013 U1 | 11/1996 | Germany . |
| 297 00 613 U1 | 1/1997 | Germany . |
| 297 03 643 U1 | 2/1997 | Germany . |
| 297 04 016 U1 | 3/1997 | Germany . |
| 64-18691 | 1/1989 | Japan . |
| 1-12257 | 8/1989 | Japan . |
| 3-81475 | 8/1991 | Japan . |
| 3-89290 | 9/1991 | Japan . |
| 05272665 | 10/1993 | Japan . |
| 6-54980 | 7/1994 | Japan . |

| | | |
|---|---|---|
| 7-19688 | 4/1995 | Japan . |
| 7-28282 | 5/1995 | Japan . |
| 8-338568 | 12/1996 | Japan . |
| 558 903 | 2/1975 | Switzerland . |
| 1222966 | 2/1984 | U.S.S.R. . |
| 24748 | of 1910 | United Kingdom . |
| 5808 | of 1915 | United Kingdom . |
| 305003 | 8/1928 | United Kingdom . |
| 377439 | 7/1931 | United Kingdom . |
| 716315 | 4/1951 | United Kingdom . |
| 830627 | 5/1957 | United Kingdom . |
| 883696 | 5/1959 | United Kingdom . |
| 965905 | 11/1959 | United Kingdom . |
| 1315952 | 9/1969 | United Kingdom . |
| 1 362 159 | 7/1974 | United Kingdom . |
| 1577726 | 7/1976 | United Kingdom . |
| 2244087 | 4/1991 | United Kingdom . |

OTHER PUBLICATIONS

"Waveform Cleats, Hanger Brackets, Linear Heat Sensor Cable Clips", brochure, by BICC Vantrunk, Ltd., dated 1985, 2 pages.

"Caddy Fasteners for the construction industry", by ERICO Products, Inc.,catalog, dated 1988, 5 pages including pp. 1–3.

"Swifts Cable Ladder", by Swifts of Scarborough Limited, catalog, dated Nov. 1990, 3 pages.

"OBO–Kabeltrag–Systeme KTS", by OBO Bettermann, catalog, dated 1990, 3 pages.

"Negurosu General Catalogue", catalog No. 1040, by Negurosu Denko K.K., dated 1991, 4 pages.

"CADDY® Fasteners", Acoustical Price List, AC–9, by ERICO Products, Inc., dated Jan. 1, 1992, 2 pages.

Russian Publication, dated 1993, 2 pages.

"OBO–Kabeltrag–Systeme KTS", brochure, by OBO Bettermann, dated Apr. 1994, 4 pages.

"CADDY® Fasteners, CF–43", Price List, by ERICO dated Apr. 1, 1994, 4 pages including pp. 64–67, 92–99.

"CADDY® Fasteners For Communications & Low Voltage Applications", catalog, by ERICO, dated 1994, 24 pages including pp. 1–22.

"Electrical Tools and Supplies", Catalog #AD–250, by Gardner Bender, dated 1994, 3 pages including p. 218.

"Just The Right Fastener™, CADDY® Fasteners", brochure, by ERICO, dated 1994, 6 pages including pp. 17, 95–97.

"OBO Betterman" Catalog, dated 1994, 1 page, p. 30, 1994.

"roughlyte II HID Vaportight Fixture",brochure, by STONCO, dated Jul. 17, 1995, 4 pages.

"ANSI/TIA/EIA Standard, Commercial Building Telecommunications Cabling Standard,568–A (Revision of EIA/TIA–568)", by Telecommunications Industry Association, dated Oct. 1995, 5 pages.

"Just the Right Fastener™, For Immediate Release, CADDY®", brochure, by ENRICO, Inc., dated Mar. 5, 1996, 3 pages including pp. 1–3.

"Spring Steel Fasteners, Product and Application Guide", catalog, by B–Line Systems, Inc.,dated 1995, 25 pages including pp. 2, 8, 9, 12–14, 16, 46, 48, 50, 53, 76, 86, 94–96, 98, 100, 112, 113, 115, 127.

"Distributor Management Digest", vol. 9, No. 1, dated Jan. 1996, 12 pages including pp. 1–12.

"Cabling Business Magazine", vol. 6, No. 3, by ERICO, Inc., dated Mar. 1996, 6 pages.

"Graybar/Your Connection Cabling Support Solutions For Datacom Applications From ERICO® Fastening Products", catalog, by ERICO, Inc., dated 1996, pp. 1–26, 1996, admitted prior art.

"Category Products For Voice and Data Communications", brochure, by General Cable Datacom/Electronic Products, dated 1996, 6 pages.

"Pipe Hangers, Figure B3690 adjustable "J" Hanger", by B–Line® Systems, Inc., undated, 1 page, p. 31, admitted prior art.

"Inverted "T" & Trapeze Hanger With Over and Under Cross Bars", by Samtan Engineering Corp.,Undated, 1 page, admitted prior art.

"Negurosu B5–301",brochure, by Negurosu Denko K.K., Undated, 4 pages including pp. 102–103, admitted prior art.

"RTD Wireway Hanger", brochure, by Research Took & Die Works, undated, 5 pages, admitted prior art.

"Swifts Product Guide", brochure, by Swifts of Scarborough Limited, Undated, 3 pages, admitted prior art.

Advertisements published in Feb. 1996 issue of CEE News, 1 page, admitted prior art.

CABLE SUPPORT HAVING PIVOTALLY AND SLIDABLE RETAINER

BACKGROUND OF THE INVENTION

This invention relates generally to supports for supporting cable, electrical wiring and the like (generally referred to in the trade as "cable" or "cabling"), and more specifically to a support having a retaining member for retaining cable therewithin.

Cable supports are generally attached to supporting structure such as beams, rods, ceilings or walls for supporting cable along the ceilings or walls, in attics, crawl spaces or other locations. The support clips typically have a hook at a lower end for supporting the cable. The cable must be retained in the hook to prevent the cable from slipping off of the support as the cable is pulled through a series of supports. Presently available cable supports have openings in opposite sides of the hook for feeding a cable tie wrap therethrough and securing the cable in place. In order to remove the cable from the support clip, the tie wrap is typically cut and removed from the hook to provide access to the cable. A new tie wrap must be fed through the openings and around the hook and cable to secure the cable after the cable is installed in the hook. The removal and replacement of the tie wrap significantly increases the cable installation time and maintenance time for removing and replacing cable.

Moreover, a cable support is often used in an enclosed space such as above ceilings or between walls, in which industry and safety standards often require the material installed within the space to be flame retardant (referred to in the trade as "plenum rated"). This significantly increases the cost of the tie wrap, which must be replaced each time the cable is removed from the support.

Furthermore, the cable tie may damage the cable if it is pulled tightly against the cable. Industry standards for high speed data transmission cable typically preclude the use of cable ties due to the sensitivity of the cable to damage by pressure exerted on the cable by cable ties.

Accordingly, there is presently a cable need for a cable support which has a retaining member for holding cable in place without exerting pressure on the cable and which is attached to the support for ease of installation and repeated use, and which is flame retardant and economical to manufacture.

SUMMARY OF THE INVENTION

Among the several objects of this invention may be noted the provision of a cable support clip having a retaining member attached thereto for retaining cable therewithin; the provision of such a support in which the retaining member is easily moved between a closed position for retaining the cable in the support and an open position in which the retaining member does not interfere with the placement or removal of cable in or from the support; the provision of a support which is flame retardant; and the provision of such a support which reduces installation and maintenance time and cost and is economical to manufacture.

Generally, a cable support of this invention is for supporting cable in a generally horizontal position. The support clip comprises a generally J-shaped hook having a central cable supporting portion and first and second legs extending up from opposite ends of the central cable supporting portion. The support clip further comprises a retaining member movable from a cable receiving position in which the retaining member is attached to the first leg and held in a position in which the retaining member does not interfere with insertion or removal of the cable in or from the support, to a cable retaining position in which the retaining member extends from the first leg to the second leg generally parallel to the central cable supporting portion to retain the cable within the hook of the support, and back to its cable receiving position.

The invention also involves a method for installing cable in a cable support. The support clip is of the type comprising a generally J-shaped hook having a central cable supporting portion and first and second legs extending up from opposite ends of the central cable supporting portion generally parallel to one another. The support further comprises a retaining member movable from a cable receiving position in which the retaining member is attached to the first leg and held in a position in which the retaining member does not interfere with insertion or removal of the cable in or from the support, to a cable retaining position in which the retaining member extends between the first leg and the second leg to retain the cable within the hook of the support clip, and back to the cable receiving position. The method comprises the steps of laying cable over the cable supporting portion of the hook and removably attaching the retaining member to the second leg of the hook and locking the retaining member in place.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figures 1, 2:
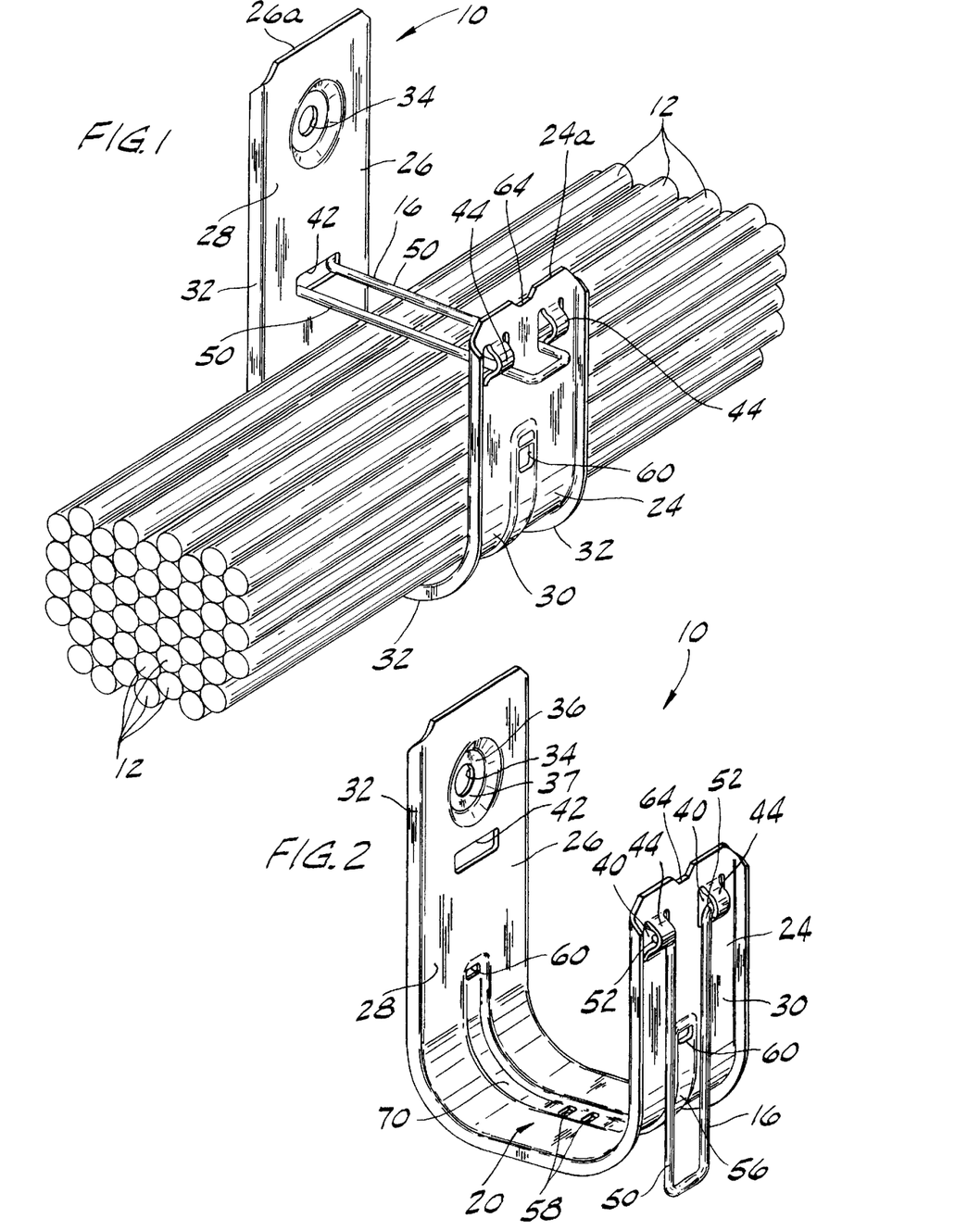
FIG. 1 is a perspective view of a cable support clip of the present invention shown in its cable retaining status with cable retained therein.
FIG. 2 is a perspective view of the support of FIG. 1 shown in its cable receiving status.

Referring now to the drawings, and first to FIG. 1, a cable support of the present invention is generally indicated at 10. The support 10, which may also be referred to as a cable support, supports cable in a generally horizontal position along the length of a wall, ceiling, beam or other support structure (not shown). The support 10 may also be attached to a bracket suspended from overhead structure by a hanger rod, for example. The cable 12 may be transmission cable (such as twisted pairs, fiber optic or innerduct), electrical wiring and the like (generally referred to in the trade as "cable" or "cabling"). More specifically, the cable support 10 may be used to support cable generally known in the trade as "category 5 cable".

The cable support 10 comprises a generally J-shaped hook for supporting the cable 12 and a retaining member 16 for retaining the cable in the hook. The retaining member 16 prevents the cable 12 from falling off of the hook as the cable is pulled through the hook during installation or over time due to expansion and contraction of the cable and hook. The retaining member 16 is pivotally and slideably moveable from a cable receiving position (FIG. 2) in which it is securely attached to the hook but does not interfere with placement or removal of the cable 12 in or from the support 10, to a cable retaining position (FIG. 1) in which the retaining member retains the cable within the hook, and back to its cable receiving position. The retaining member 16 extends generally parallel to the bottom of the hook and is preferably spaced from the cable 12 when it is in its cable retaining position to prevent damage to the cable by the retaining member.

The hook has a central cable supporting portion 20, a first relatively short vertical leg 24 terminating in an upper end 24a, and a second longer vertical leg 26 terminating in an upper end 26a above the upper end 24a of the first leg. The first and second legs 24, 26 extend up from opposite ends of the central cable supporting portion are generally parallel to one another (FIG. 2). As shown in the drawings, the central portion 20 of the hook is generally channel-shaped, having a flat bottom section 20a and upwardly curving end sections each designated 20b. The legs 24, 26 and central portion 20 of the hook combine to define a cable fill area for holding cable. The hook has an inner surface 28, an outer surface 30 and side flanges 32 extending outwardly from the outer surface on both sides of the hook so that sharp edges of the hook do not damage the cable supported by the hook. The second leg 26 has an opening 34 formed toward its upper end above the upper end 24a of the first leg 24 for receiving a fastener (not shown) for attaching the hook to supporting structure. The opening 34 is formed in a boss 36 projecting outward from the outer surface 30 of the second leg 26 for mounting two hooks back to back or one hook to a wall. The boss 36 preferably has a generally flat surface 37 which is coplanar with outer edges of the flanges 32 so that the boss and edges of the flanges rest against the wall to prevent buckling of the hook when the fastener is tightened. The hook is preferably formed from a thin metal strip having flanges 32, the strip being bent to the J-hook formation shown. It is to be understood that the hook may be formed from different materials or have configurations other than those specifically shown without departing from the scope of this invention.

The first and second legs 24, 26 have openings 40, 42, respectively, therein for receiving the retaining member 16. The first leg 24 has two openings 40 adjacent its upper end 24a, these openings being spaced one from the other transversely of the leg. The openings 40 are each formed by punching out portions of the sheet metal of the first leg 24 to form a loop 44 (generally, cradle) projecting outward from the outer surface 30 of the first leg. The second leg 26 has a slot formation comprising a rectangular slot 42 formed therein spaced approximately the same vertical distance from the central portion 20 as the openings 40 in the first leg 24.

The retaining member 16 is a generally resilient U-shaped wire member having two arms 50 and fingers 52 extending outward from the free ends of the arms. As shown in FIG. 2, when the wire member 16 is in its cable receiving position, the fingers 52 are held on the support clip 10 by the retaining loops 44 so that the wire member is disposed adjacent to the outer surface 30 of the first leg 24 and extends generally parallel to the first leg completely outside the cable fill area. The retaining loops 44 are located on the outer surface 30 of the hook to prevent interference with the installation or removal of cable 12 in or from the cable fill area of the hook, and further to prevent damage to the cable. It is to be understood that the wire member 16 may have configurations other than the one shown and may be retained on the hook by other retaining means which hold the wire member on the hook in a position away from the inner surface 28 of the hook, without departing from the scope of the invention. For example, the wire member 16 may be attached to outer edges of the first leg or pivotally attached to an upper edge of the first leg 24 rather than extend through openings 40 in the first leg. The wire member 16 may also be attached to the second leg rather than the first leg when in its cable receiving position.

Figures 3, 4, 5:
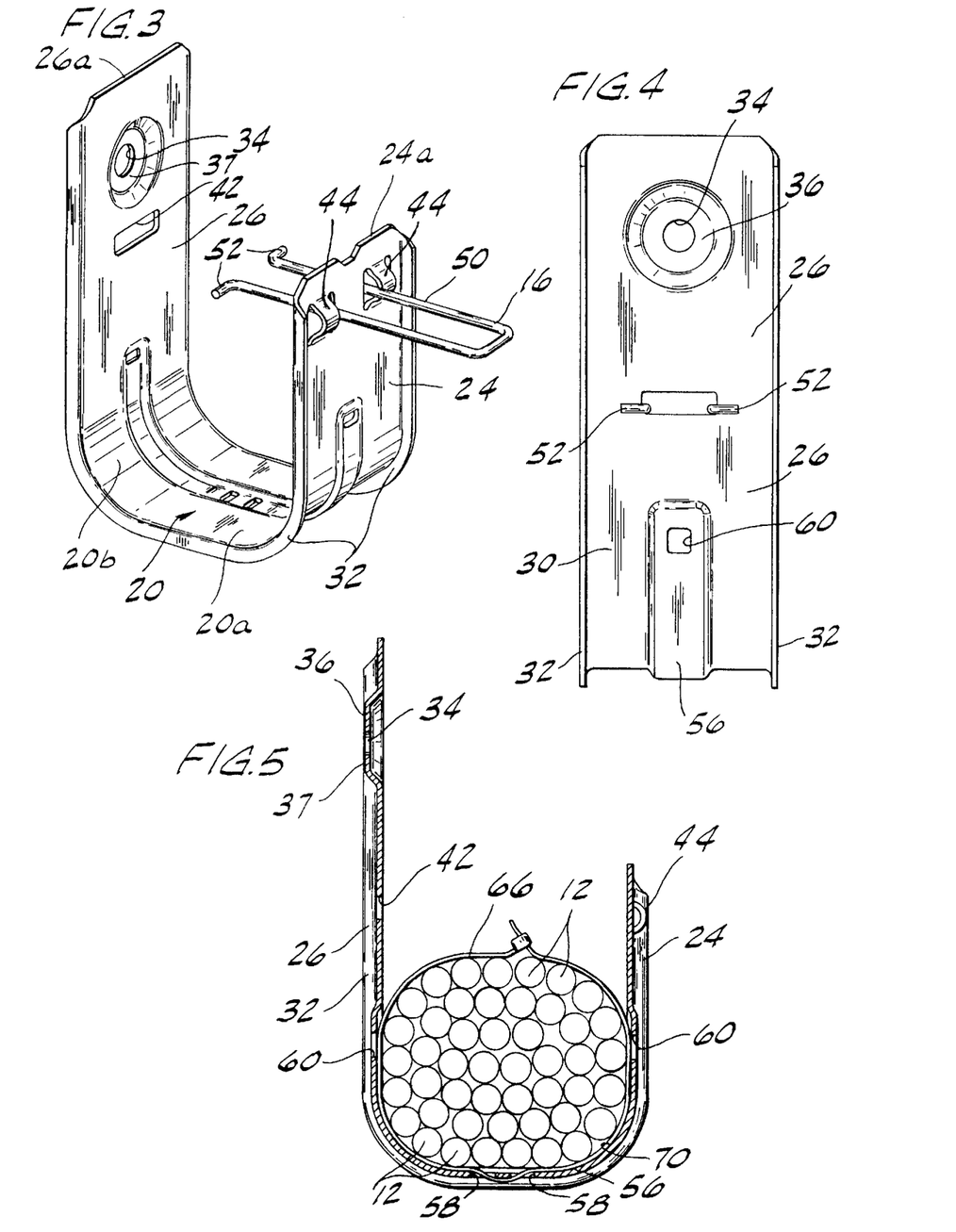
FIG. 3 is a perspective view of the support of FIG. 2 shown with a retaining member being moved to or from its cable receiving position.
FIG. 4 is a rear view of the support of FIG. 1.
FIG. 5 is a view in transverse vertical section of the support with the retaining member removed and a tie wrap installed.

As shown in FIG. 3, the arms 50 slide through the openings 40 for insertion of the fingers 52 in the slot 42 to position the wire member 16 in its cable retaining position. The slot 42 formed in the second leg 26 has a width less than the distance between outer ends of the fingers 52 of the wire member 16 when the wire member is in a relaxed condition. The wire member 16 is so configured that when its arms 50 are squeezed inward toward one another the fingers 52 fit through the slot 42, and when the arms 50 are released the fingers spring outward for engagement of the wire member 16 with the second leg to lock the wire member in place (FIG. 4). It is to be understood that the means for locking the wire member 16 in its cable retaining position may be different than those shown without departing from the scope of this invention.

The hook has a rib 56 struck out from the sheet metal thereof extending along the central cable supporting portion 20 and extending outward from the outer surface 30 of the hook (FIG. 2). Apertures 58, 60 are formed in the rib for receiving a tie wrap 62 for securely holding the cable 12 in a fixed position (FIG. 5). The flat bottom section 20a of the central supporting portion 20 has two closely spaced apertures 58 formed therein for feeding the tie wrap 62 through to connect the cable 12 to the hook 10. The tie wrap 62 is inserted through the two apertures 58 before the cable 12 is installed and then wrapped around the cable after installation. Two additional apertures 60 are formed in the first and second legs for receiving a tie wrap 62 which extends over the cable and around the outer surface of the hook (not shown). A tie wrap 62 may also be installed by inserting the tie wrap through the slot 42 in the second leg 26, and wrapping the tie wrap around the outer surface 30 of the hook and over the first leg 24. A notch 64 is formed in the upper end of the first leg 24 for receiving a tie wrap 62 (FIG. 2). The rib 56 forms a channel 70 on the inner surface 28 of the hook which provides a space in which the tie wrap 62 may be disposed without interfering with the cable 12 (FIG. 5). This allows the cable 12 to lie on the wide flat bottom section 20a of the central cable supporting portion 20 of the hook rather than on the narrow tie wrap 62. The channel 70 also eliminates contact between the cable 12 and sharp outer edges of the apertures 58, 60. The tie wrap 62 may be used with industrial cable or low speed data transmission lines, for example, which are less susceptible to damage by the tie wrap. The rib 56 also acts as a stiffening rib so that less material is required to provide sufficient rigidity to the hook.

Figure 6:
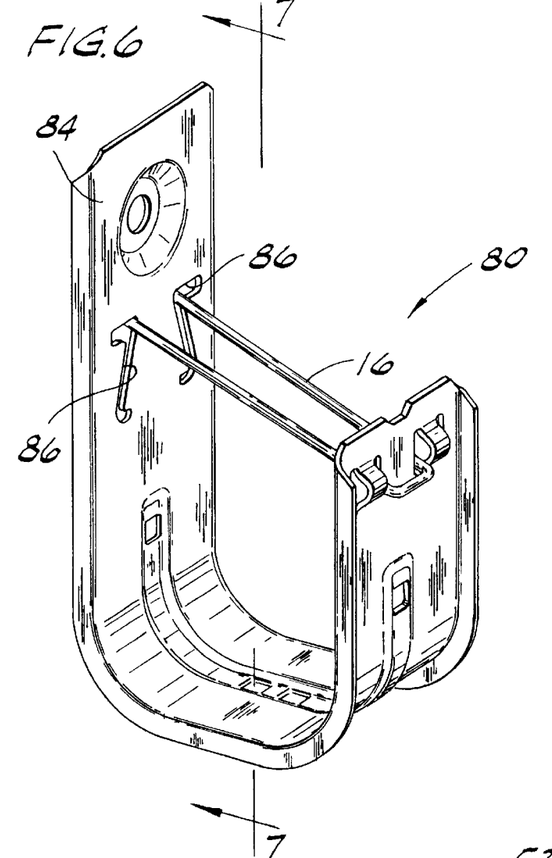
FIG. 6 is a perspective view of a second embodiment of a support of the present invention.
Figure 7:
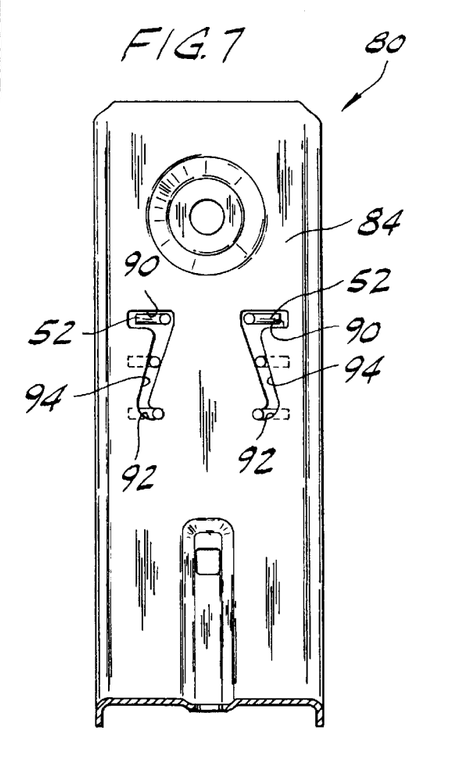
FIG. 7 is a cross-sectional view taken generally on line 7—7 of FIG. 6, with ends of the retaining member shown in an insert position and shown in phantom in a partially locked position and a locked position.

A second embodiment of the present invention is shown in FIGS. 6 and 7 and generally indicated at 80. The hook of the second embodiment is similar to the hook of the first embodiment except that the slot formation in the second leg 84 comprises two camming slots 86 instead of the rectangular slot 42 of the first embodiment. Each camming slot 86 is generally Z-shaped and has an upper horizontal slot 90, a lower horizontal slot 92 and an angled slot 94 connecting the two horizontal slots. The camming slots 86 are so configured that the fingers 52 of the wire member 16 may be inserted in the upper horizontal slots 90 when the arms 50 are in their relaxed condition. The arms 50 are spread outward as the wire member 16 is moved downward, by the camming action of the angled slots 94 which guide the arms to the lower slot 92 where the arms are free to spring inward to their relaxed condition and lock in place.

The camming slots 86 are generally used on smaller size cable support 80 (i.e., support clips having a distance between the first and second legs of approximately 2 in.) wherein the retaining member 16 has relatively short arms. The camming slots 86 simplify moving of the wire member 16 into its cable retaining position, since it is difficult to squeeze together the arms 50 of a small wire member 16 required for the smaller cable support 10. The camming slots 86 eliminate the need to squeeze together the arms 50 of the wire member 16 prior to inserting the fingers into the upper horizontal slots 90.

To use the cable support 10, 80 of the present invention, the wire member 16 is moved to its cable receiving position in which it is disposed generally adjacent to the outer surface 30 of the first leg 24 and retained by the retaining loops 44 formed in the first leg so that no part of the wire member is disposed within the cable fill area of the hook. Cable 12 is then laid over the cable supporting portion 20 and properly positioned within the hook. For the support 10 of the first embodiment, the wire member 16 is pivoted up from the position shown in FIG. 2 to a position in which can be slidably pushed through the openings 40 in the first leg 24, over the cable 12 and through the slot 42 in the second leg 26 by squeezing the arms 50 of the wire member together until the fingers 52 fit through the slot (FIG. 1). The arms 50 of the wire member 16 are then released and the wire member is locked in place. To move the wire member 16 from its cable retaining position to its cable receiving position, the arms 50 are squeezed together until the fingers 52 are free to be pulled back through the slot 42. The wire member 16 is then slidably and pivotally moved to its cable receiving position (FIG. 2).

In order to move the retaining member 16 of the cable support 80 of the second embodiment to its cable retaining position, the fingers 52 of the wire member 16 are inserted through the upper horizontal slots 90 of the camming slots 86 and the wire member is moved downward until the fingers 52 reach the lower slots 92, wherein the arms 50 of the wire member 16 are allowed to spring back to their original position to lock the wire member in place with the arms extending through the lower slots 92 (FIGS. 6 and 7). To move the wire member 16 from its cable retaining position to its cable receiving position, the arms 50 are moved upward until the fingers 52 reach the upper horizontal slots 90. The wire member 16 is then slidably and pivotally moved to its cable receiving position adjacent the first leg 24.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A cable support comprising a hook formed from a strap of bent sheet metal, said hook having a wide central portion for supporting cable thereon in a generally horizontal position, a first relatively short vertical leg extending up from one end of the central portion and terminating in an upper end, a second longer vertical leg extending up from an opposite end of the central portion and terminating in an upper end above the upper end of the first leg, said first and second vertical legs and said central portion of the hook together defining a cable fill area for placement of cable therein, and a retaining member pivotally attached to the first leg adjacent its upper end for pivotal movement of the retaining member from a cable-receiving position to a position in which the retaining member can be slidably moved toward a cable-retaining position in which the retaining member extends from the first leg to the second leg for retaining cable in the hook, said first lea being formed to provide a cradle adjacent its upper end outside the cable fill area to support the retaining member in said cable-receiving position in which the retaining member is completely removed from the cable fill area so that no part of the retaining member can interfere with placement of cable in the fill area, a retainer opening in the second leg for receiving the retaining member when the retaining member is in said cable-retaining position, and a fastener opening in the second leg above the retainer opening for receiving a fastener for attaching the hook to a support structure.

2. A cable support as set forth in claim 1 wherein said retaining member comprises a U-shaped wire member having two arms and fingers extending laterally from ends of the arms, said first leg having two openings and the cradle including two retaining loops adjacent the two openings, said retaining loops being located outside said cable fill area and being engageable by the fingers of the wire member when the wire member is in its cable-receiving position, said fingers being rotatable in said loops to allow pivoting of said retaining member into a position in which it can be slidably moved toward and away from said cable-receiving position.

3. A cable support as set forth in claim 1 wherein said retaining member comprises a generally U-shaped wire member having two arms and fingers extending laterally from ends of the arms, said second leg of the hook having two camming slot formations therein, each slot formation comprising a first substantially horizontal slot, a second substantially horizontal slot and an angled slot connecting the two horizontal slots, the slot formations being so configured that the fingers of the wire member can be inserted into and through respective first slots when the arms are in a relaxed condition, after which the arms can be moved along respective angled slots, thereby causing the arms resiliently to spread apart until the arms reach said second slots whereupon the arms are adapted to spring back toward one another to lock the wire member in its said cable-retaining position.

4. A cable support as set forth in claim 1 further comprising reinforcing flanges along opposite sides of the hook extending outwardly from an outer surface of the hook and terminating in outer flange edges, said fastener opening being in a boss projecting outward from said outer surface of the second leg and terminating in a plane generally coplanar with said outer flange edges.

5. A cable support as set forth in claim 1 further having at least two closely spaced apertures in the central portion of the hook for receiving a tie wrap for securely holding the cable in a fixed position within said cable fill area.

6. A cable support as set forth in claim 5 further having a rib extending outwardly from an outer surface of the hook, said apertures being located in said rib.

7. A cable support as set forth in claim 1 wherein said central portion of the hook has a flat middle section and curved end sections.

8. A cable support comprising a hook formed from a strap of bent metal, said hook having a wide channel-shaped central portion for supporting cable thereon in a generally horizontal position, said central portion having a flat middle section and curved end sections, a first relatively short vertical leg extending up from one end of the central portion and terminating in an upper end, a second longer vertical leg extending up from an opposite end of the central portion and terminating in an upper end above the upper end of the first leg, said first and second vertical legs being spaced apart to enable cable to placed in said central portion, a fastener opening in the second leg toward its upper end for receiving a fastener for attaching the hook to a support structure, and reinforcing flanges at opposite sides of the hook, each flange extending continuously along the central portion and said first and second legs at a respective side of the hook, and a first pair of closely spaced apertures in said flat middle section of the hook for receiving a tie to secure said cable to the hook.

9. A cable support as set forth in claim 8 further comprising a rib extending along said central portion and vertical legs of the hook, said first pair of apertures being in said rib at spaced intervals along said rib.

10. A cable support as set forth in claim 9 further comprising a second pair of apertures in said first and second substantially vertical legs for receiving a tie therethrough so that the tie extends above said central portion of the hook, said second pair of apertures being located in said rib.

11. A cable support for supporting cable in a generally horizontal position, the support comprising a generally J-shaped hook having a central cable supporting portion and first and second legs extending up from opposite ends of the central cable supporting portion, said first and second legs and said central cable supporting portion together defining a cable fill area, a retaining member on the hook movable from a cable-receiving position in which the retaining member is attached to the first leg and held in a position in which the retaining member does not interfere with insertion or removal of the cable in or from said cable fill area, to a cable-retaining position in which the retaining member extends from the first arm to the second arm generally parallel to the central cable supporting portion to retain the cable within said cable fill area, and back to its cable-receiving position, said retaining member comprising a U-shaped wire member having two arms and fingers extending outward from ends of the arms, two openings in the first leg slidably receiving respective arms of the wire member, a slot formation in the second leg generally opposite said two openings in the first leg, the wire member being configured such that when its arms are squeezed inward toward one another the fingers fit through the slot formation and when the arms are released they spring outward for engagement with the second leg of the hook to lock the wire member in said cable-retaining position, and two retaining loops adjacent said two openings in the first leg for holding the fingers of the wire member when the wire member is in its cable-receiving position.

12. A cable support as set forth in claim 11 wherein said slot formation comprises two camming slots, each camming slot comprising an upper horizontal slot, a lower horizontal slot and an angled slot connecting the two horizontal slots, the camming slots being so configured that the fingers of the wire member fit through the upper horizontal slots when the arms of the wire member are in a relaxed condition.

13. A cable support as set forth in claim 11 further comprising a boss projecting outward from an outer surface of the second leg, and an opening in said boss for receiving a fastener for attaching the cable support to a supporting member.

14. A method of installing cable in a cable support of the type comprising a generally J-shaped hook having a central cable supporting portion and first and second legs extending up from opposite ends of the central cable supporting portion, said first and second legs and said central cable supporting portion together defining a cable fill area for holding cable, and a retaining member pivotally attached to the first leg and supported on the first leg by a cradle formed in the first leg, the method comprising the steps of:

laying cable in said cable fill area of the hook;

pivoting the retaining member up from a position in which it extends alongside the first leg and is supported by said cradle completely out of said cable fill area to a generally horizontal position;

slidably moving the retaining member through one or more openings in the first leg in a direction toward the second leg; and locking the retaining member to the second leg in a cable-retaining position in which the retaining member extends between the first and second legs over the cable to retain the cable within the cable fill area of the hook.

15. A method as set forth in claim 14 wherein said locking step comprises inserting the retaining member into a camming slot formation in the second leg of the hook and then moving the retaining member along the camming slot formation to a locked position.

* * * * *

UNITED STATES PATENT AND TRADEMARK OFFICE
CERTIFICATE OF CORRECTION

PATENT NO. : 5,961,081
DATED : October 5, 1999
INVENTOR(S) : Eric R. Rinderer

It is certified that error appears in the above-identified patent and that said Letters Patent is hereby corrected as shown below:

Title page, item [54] and col. 1, should read --CABLE SUPPORT --.

Column 6, claim 1, line 17, "lea" should read --leg--.

Signed and Sealed this

Twenty-second Day of August, 2000

Attest:

Q. TODD DICKINSON

*Attesting Officer*         *Director of Patents and Trademarks*